July 29, 1924.
J. E. PARKER
1,502,796
CONVEYER FOR PEANUT DIGGERS
Filed July 13, 1922    2 Sheets-Sheet 2
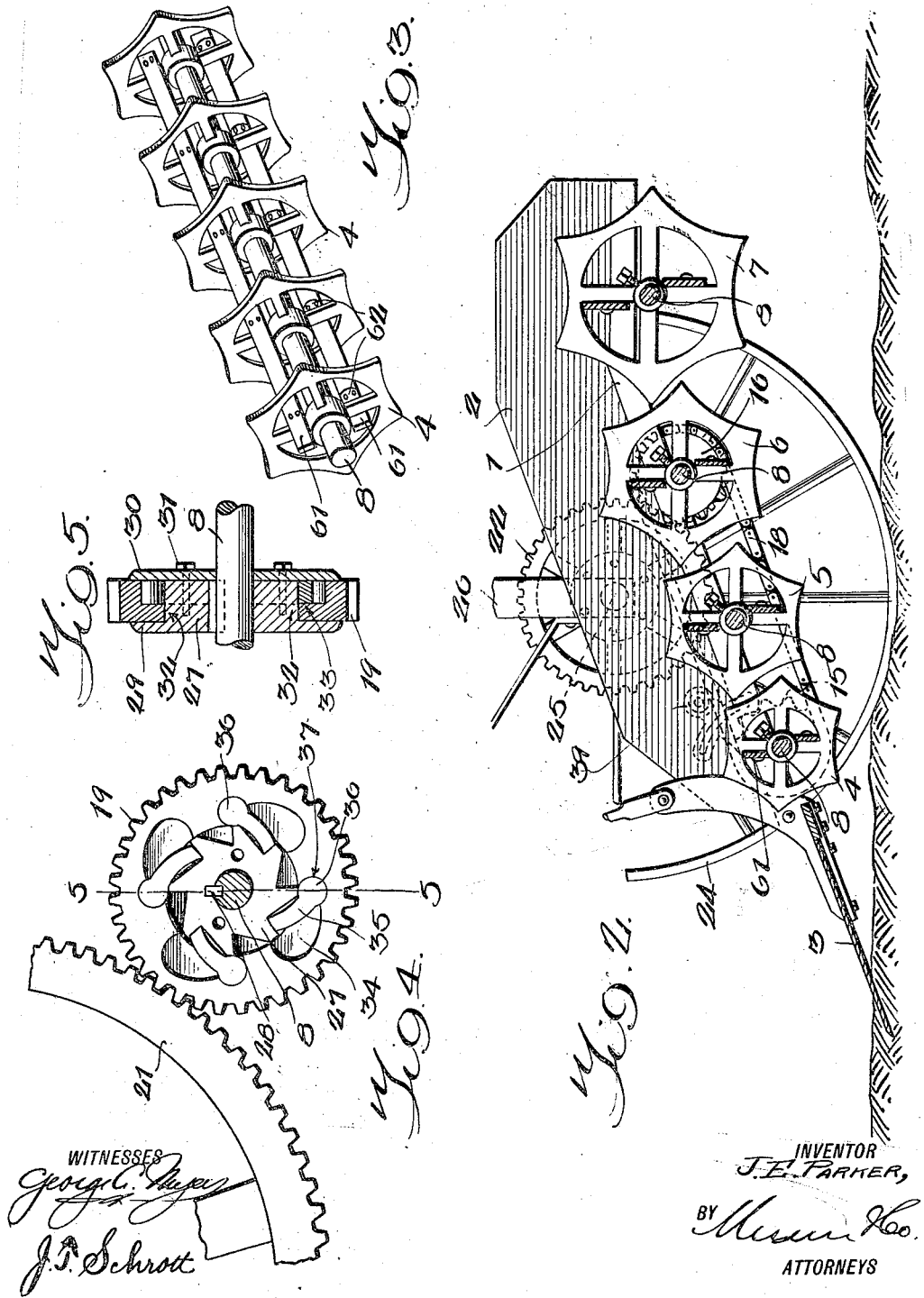
INVENTOR
J. E. PARKER,
BY
ATTORNEYS Patented July 29, 1924.

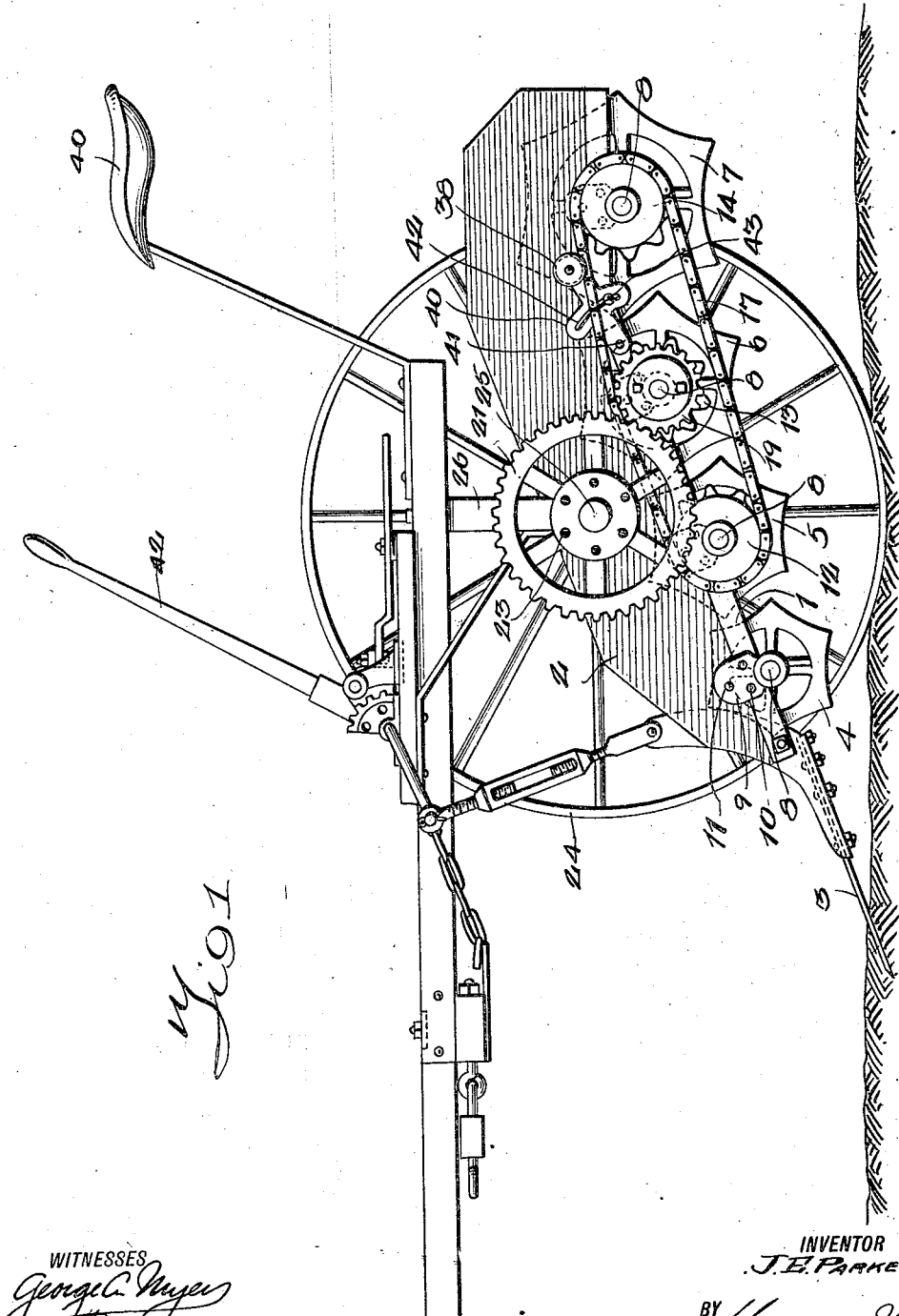

1,502,796

UNITED STATES PATENT OFFICE.

JAMES EDWARD PARKER, OF NORFOLK, VIRGINIA.

CONVEYER FOR PEANUT DIGGERS.

Original application filed June 1, 1922, Serial No. 385,596. Divided and this application filed July 13, 1922. Serial No. 574,774.

*To all whom it may concern:*

Be it known that I, JAMES EDWARD PARKER, a citizen of the United States, and a resident of Norfolk, in the county of Norfolk and State of Virginia, have invented certain new and useful Improvements in Conveyers for Peanut Diggers, of which the following is a specification.

My invention relates to improvements in peanut diggers and more especially to conveyers therefor, and it consists of the constructions, combinations and mode of operation herein described and claimed.

An object of the invention is to provide a conveyer for carrying the vines from the plow to the rear of a peanut digger, at the same time tumbling the vines so as to shake out the dirt and discharge them perfectly clean and ready to be stacked.

A further object of the invention is to provide a conveyer for the purpose described composed of a plurality of uni-directionally rotating shafts with star wheels in slightly overlapping relation, this arrangement causing the shaking of the vines as they are conveyed from the plow to the discharge end of the peanut digger.

Another object of the invention is to provide a conveyer for the purpose described in which each of the revolving star wheel units is equipped with narrow plates running longitudinally of the shafts for the purpose of preventing the vines from wrapping around the shafts.

A further object of the invention is to provide a conveyer having rotating elements of such a nature as to present an undulating surface during operation.

Other objects and advantages will appear in the following specification, reference being had to the accompanying drawing, in which:

Fig. 1 is a side elevation of a peanut digger embodying the improved conveyer,

Fig. 2 is a detail longitudinal section illustrating a portion of the peanut digger and showing the driving chain of certain of the revolving units on the far side, Fig. 3 is a detail perspective view of one of the star wheel units, Fig. 4 is a detail elevation of one of the ratchets with the cover plate removed, and Fig. 5 is a section on the line 5—5 of Fig. 4.

This is a division of my co-pending application for Letters Patent for peanut digger, filed June 1, 1920, Serial No. 385,596, in so far as it relates to the conveyer structure disclosed therein. The peanut digger, of which the conveyer forms a part, is composed of a digger frame having longitudinal side bars 1, sheet metal sides 2 and a plow 3.

The conveyer is composed of a plurality of series of star wheels 4, 5, 6 and 7, the star wheels of each series becoming progressively larger as the distance increases from the plow 3, in other words, rearwardly. The star wheels of one series slightly overlap those of the series next adjacent, it being obviously necessary to suitably stagger the various star wheels so that the periphery of one may pass the periphery of the next. If desired, the star wheels may be arranged for adjustment as shown in Fig. 2, the purpose of the adjustment being to enable distributing the star wheels in such a manner as to form a sufficiently close space to prevent the vines from working through.

It is to be observed that the points or prongs of the star wheels are joined by webs of shallow concave formation. It is conceivable that if all of the star wheels were turned a little farther in Fig. 2 so as to bring adjacent points closer together, the connecting webs would form a platform which might appear substantially level. Turning the wheels a little farther would bring the points of each series uppermost; this changing of position of the star wheels presents an undulating surface in the operation of the conveyer, and the obvious purpose of the arrangement described is to thoroughly shake out the vines but at the same time preserve a sufficiently solid foundation to prevent the vines and perhaps the peanuts, from dropping through.

Figs. 1 and 2 show the star wheels of each series becoming progressively larger toward the discharge end of the digger. As the increasingly larger star wheels are of greater distances between points, the intensity of the shaking action will increase toward the end of the shaking operation. In other words, the small star wheels at the entrance of the conveyer produce a rather slow and slightly undulating shaking motion, while the larger star wheels, when reached, produce a more violent undulating and shaking motion.

Each series of star wheels is mounted upon a shaft 8. These shafts are journalled at the ends in bearings 9 which are secured to the side bars 1 at 10 and extend up far enough to enable the mounting of the sheet metal sides 2 at 11. The manner of driving all of the shafts 8 and series of star wheels (which may properly be termed conveyer units) is as follows.

The shaft 8 of the series 5 carries a sprocket 12 at one end. Similar sprockets 13 and 14 are carried by the shafts of the units 6 and 7, while sprockets 15 and 16 (located on the right or opposite side of the digger) are carried by the shafts of the series 4 and 6. Chains 17 and 18 are applied to the respective alining sets of sprockets and driving power for the entire arrangement is derived from driving pinions 19 and 20 on the ends of the shaft 8 of the unit 6, which mesh with driving gears 21 and 22.

These driving gears are secured at 23 to the hubs of wheels 24 which in turn revolve on axles 25 of a yoke 26. In order that the conveyer may be driven only when the digger proceeds forwardly or turns to the right and left and stops when its direction of motion is reversed, the shaft 8 of the conveyer unit 6 carries a ratchet 27 at each end. These ratchets are keyed in place at 28 as shown in one instance in Fig. 4. The reader will understand that the arrangement in Fig. 4 is duplicated at the opposite or right end of the shaft 8. The ratchet 27 has a flange 29 at one side to aid the cover plate 30 in keeping the pinion 19 in place, fastening means 31 being used to secure the cover plate upon the hub of the ratchet. This hub includes a circular portion 32 upon which a corresponding circular portion 33 of the pinion 19 revolves.

Pockets 34 at one side of the circular portion 33 carry dogs 35 which have bosses 36 by means of which they are mounted in apertures 37 at the ends of the pockets. The dogs are intended to gravitate into the pockets upon reversal of the peanut digger but move into driving engagement with the ratchet 27 when the digger is moved either forwardly or to each side, as explained above.

In order to prevent wrapping of the vines around the shafts 8 of the conveyer units, each unit is provided with a pair of bars 61 which run longitudinally of the shaft and are secured in place on adjacent spokes which are formed with lugs 62 for the purpose. In moving along the conveyer, loose ends of vines have a tendency to reach down in between the shafts and hook into some conveniently projecting part and so wrap around the shafts. This is an objectionable feature which is wholly overcome by providing the bars 61, these acting as spacers which tend to keep the vines away from the shaft and so from wrapping around.

Idlers 38 and 39, respectively on the left and right sides of the digger, bear upon the respective chains 17 and 18 so as to keep them in tight engagement with their respective sprockets. Each idler is mounted upon a frame 40 which is pivotally mounted to the side bar 1 at 41, and has an arcuate slot 42 by means of which adjustments may be effected upon unloosening a bolt 43.

The operation may be briefly reviewed to advantage. The peanut vines are severed from the ground immediately above the tap roots of the vines by the plow 3 and moved up onto the revolving conveyer, the units 4, 5, etc., of which all turn in a clockwise direction which is contrary to the direction of motion of the wheels 24. The star shape of the wheels of the revoluble conveyer units causes a tumbling or agitation of the vines as they pass through and thus thoroughly clean, shake out the dirt and make ready the vines for the stack. While this agitation is sufficient to loosen the dirt, it is not sufficient to loosen the peanuts with solid stems, with the result that a far greater percentage of the crop is saved than can possibly be saved according to prevalent methods of harvesting.

While the construction and arrangement of the improved peanut digger conveyer as herein described and claimed, is that of a generally preferred form, obviously modifications and changes may be made without departing from the spirit of the invention or the scope of the claims.

I claim:—

1. In a peanut digger, parallel side rails forming part of a digging frame, bearings carried by said rails in transverse alinement but successively spaced farther apart toward the discharge end of the digger, a shaft journalled in each of the alining bearings, a series of star wheels on each shaft, the wheels of each series being of the same diameter but the wheels of succeeding series being larger than those of the series preceding to afford an overlapping arrangement and avoid spaces between the peripheries of the star wheels, means disposed longitudinally of each of the shafts and associated with the star wheels to prevent the vines from wrapping around the shafts, and means for adjusting each of the star wheels independently to enable any desired disposition of the star wheels over the area of the conveyer.

2. A conveyer including a unit composed of a revoluble shaft, a plurality of star wheels mounted on the shaft, a plurality of bars extending longitudinally of the shaft and reaching from one star wheel to the next to provide a spacer from the shaft to prevent the wrapping of the vines around the shaft, and lugs on certain spokes of the star wheels to enable securing the bars in place.

3. A conveyer including a unit composed of a revoluble shaft, a plurality of spoked wheels mounted on the shaft, lugs on certain spokes adjacent to openings in the wheels, and bars extending through the openings and having attachment to said lugs, said bars providing spacers for the wheels and also preventing the wrapping of vines around the shaft.

4. A conveyer including a unit composed of a shaft, a plurality of wheels having openings mounted on the shaft, and means extending through the openings and occupying a position between the shaft and the periphery of the wheels to keep vines from reaching the shaft and wrapping around.

JAMES EDWARD PARKER.